April 23, 1963  S. S. BROWN  3,087,078
COMPACT MOTOR
Filed June 26, 1961  3 Sheets-Sheet 1

INVENTOR.
STEFFEN S. BROWN
BY
Toulmin & Toulmin
ATTORNEYS

April 23, 1963  S. S. BROWN  3,087,078
COMPACT MOTOR

Filed June 26, 1961  3 Sheets-Sheet 2

INVENTOR.
STEFFEN S. BROWN
BY Toulmin & Toulmin
ATTORNEYS

United States Patent Office 3,087,078
Patented Apr. 23, 1963

3,087,078
COMPACT MOTOR
Steffen S. Brown, Dayton, Ohio, assignor to The Brown-Brockmeyer Company, Dayton, Ohio, a corporation of Ohio
Filed June 26, 1961, Ser. No. 119,379
15 Claims. (Cl. 310—83)

This invention relates to electric motors and is particularly concerned with an improved electric motor construction which is extremely compact and which includes as an integral part thereof a geared speed reducer at the output end. Electric motors of this nature are particularly useful for machines such as floor polishers or scrubbers which preferably are extremely compact in the vertical direction.

While electric motor structures, according to the present invention, can be of the polyphase type, it is the customary practice in connection with machines of this nature to employ single phase motors, usually of the induction type, which have starting windings under the control of a centrifugal switch carried by the motor at the end thereof opposite the output shaft end. Ordinarily, a centrifugal switch of this nature will require servicing before any other part of the motor.

In order to facilitate the servicing of the centrifugal switch of a single phase motor, it has been proposed to mount the switch outside the end bell at the end of the motor opposite the output shaft and to provide a sheet metal cover or the like to enclose the switch. In an arrangement of this nature, the end bell adjacent the switch is usually of a special type so as to form a recess for receiving the switch. This arrangement, while it places the switch where it can readily be serviced, is expensive and is somewhat bulkier than the usual motor construction.

Motors that run in a vertical direction, as, motors for floor polishers or scrubbers, have the disadvantage that a bearing at the upper end of the rotor shaft will tend to become dry and noisy. The bearing at the lower end of the shaft is usually well lubricated because it is disposed in or immediately adjacent to a gear box at the lower end of the motor which contains oil.

The present invention is particularly concerned with an electric motor in which a particularly advantageous position of a centrifugal control switch can be obtained and in connection with which motor, the disadvantages that have heretofore been encountered in connection with the top bearing of such a motor are eliminated. This application is by way of being a further improvement in the art over what is disclosed in my copending application entitled "Compact Machines," Serial No. 109,617, filed May 12, 1961.

As in connection with the previous application referred to above, a primary object of the present invention is the provision of an electric motor arrangement which will take up the smallest space possible in at least the axial direction of the motor.

A still further object of this invention is the provision of an electric motor in which all of the bearings supporting the motor rotor are located at one end of the motor, namely, the lower end when the motor operates in a vertical position.

Still another object of this invention is the provision of an electric motor construction having an improved supporting bearing arrangement for the motor rotor and improved accessibility for the centrifugal starting switch of the motor.

A still further object of this invention is the provision of a novel electric motor and reducing drive mechanism driven thereby in which the combination of the motor and the reducing drive is extremely compact and wherein at least some of the bearings for the combination performed double duty without, however, being excessively loaded in any way whatsoever.

In realizing the several objectives of the present invention, a motor construction is provided in which the bearing at one end of the rotor is entirely eliminated and the entire journaling of the motor takes place at the opposite end which, in the case of the present invention, is also the output end of the motor.

By eliminating the bearing at one end of the motor, it is possible to eliminate the usual end bell structure and to provide, instead, a simple sheet metal dust cover that has no connection with the rotating part of the motor.

The several objectives and advantages of the present invention will become more apparent upon reference to the following specification taken in connection with the drawings wherein.

Figure 1:
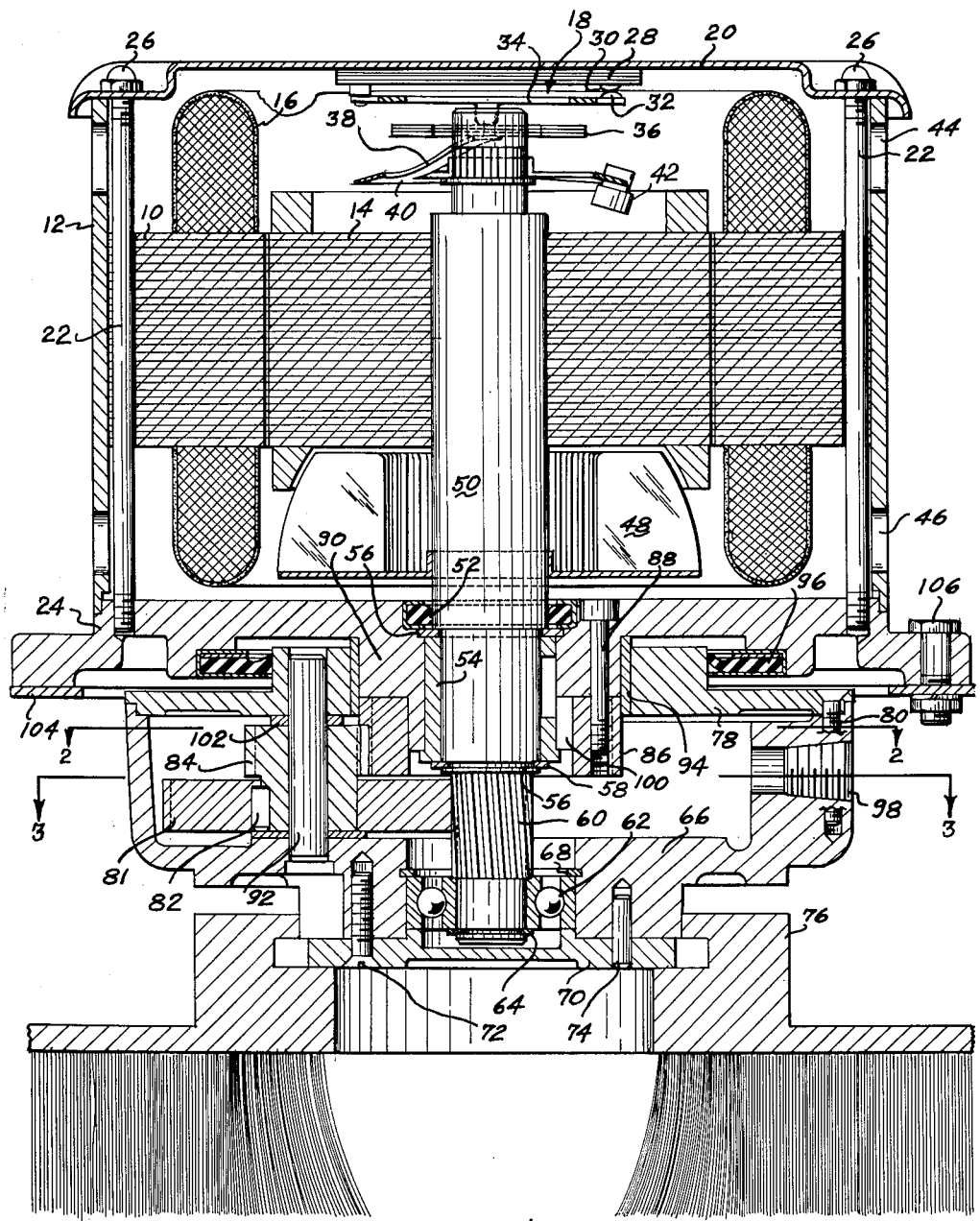
FIGURE 1 is a vertical sectional view through an electric motor and speed reducer combination constructed in accordance with the principles of the present invention.
Figure 2:
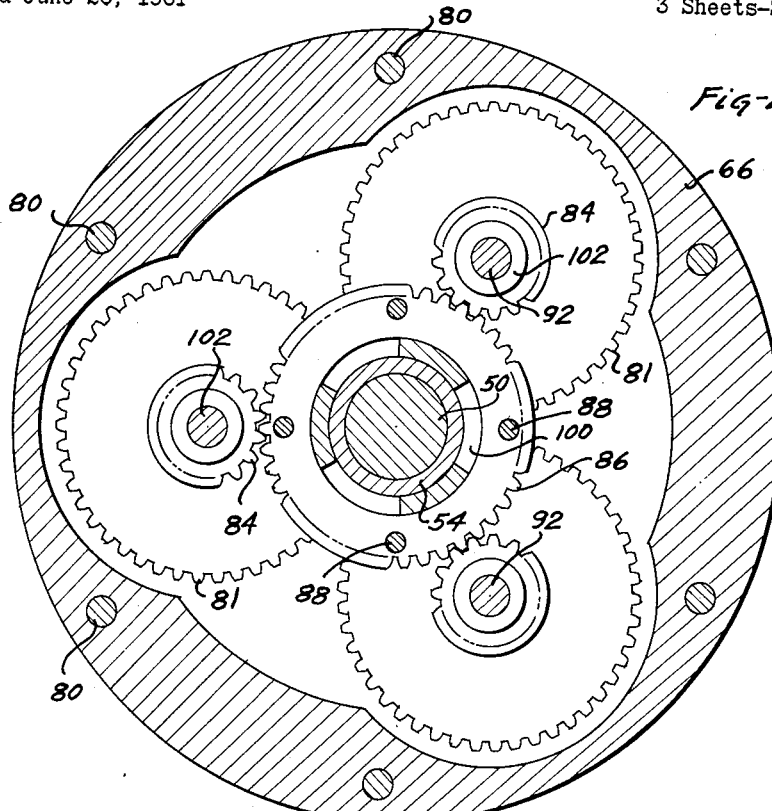
FIGURE 2 is a plan cross sectional view indicated by line 2—2 on FIGURE 1 showing the planetary gear mechanism in the speed reducer at an upper level therein.
Figure 3:
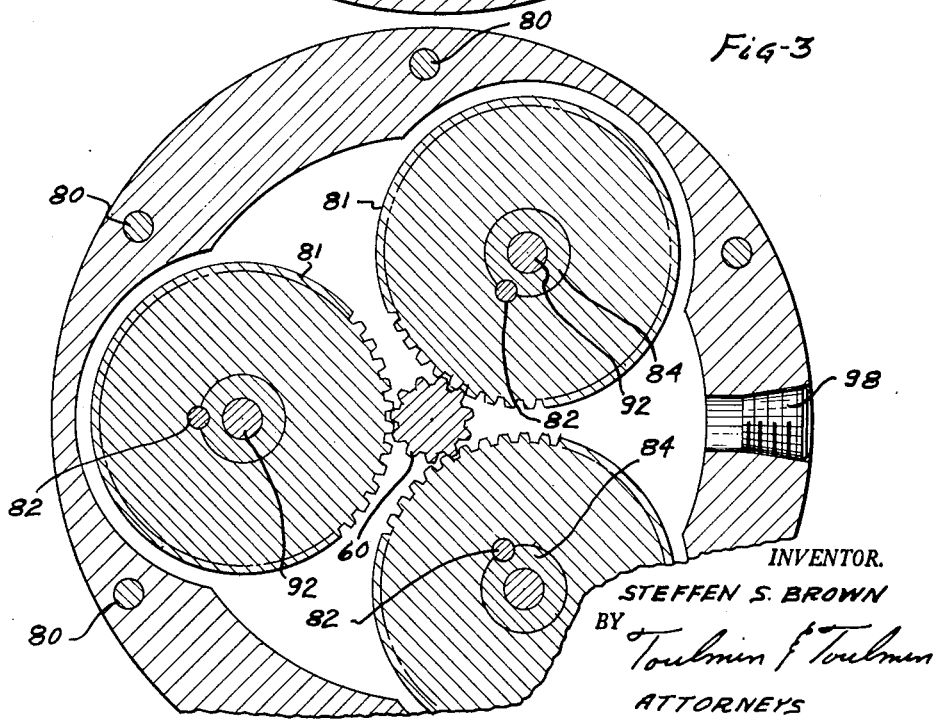
FIGURE 3 is a sectional view similar to FIGURE 2 and indicated by line 3—3 on FIGURE 1 and showing the planetary gear system at a lower level.

Referring to the drawings somewhat more in detail, the electric motor shown therein comprises a stator 10 pressed or otherwise affixed within a sleeve-like outer housing 12. Rotatably mounted in the bore of stator 10 is rotor 14. This rotor for a single phase induction type motor may be a squirrel cage type rotor in which case the windings 16 on the stator would include starting windings under the control of a starting switch 18 mounted on the inside of the sheet metal dust cover 20.

The dust cover is retained in position by the through bolts 22, which at their lower ends thread into the lower end member 24 that receives in telescope relation the lower end of housing 12. Nuts 26 on the upper ends of the through bolts retain the dust cover in place.

The centrifugal switch 18 comprises a stationary mounted part 28 attached to the inside of the dust cover and having a contact means 30 adapted for engagement by contact means 32 on a contact arm 34 also carried by member 28. Movement of arm 34 to bring the contact elements into and out of engagement is accomplished by axial movement by plate 36 that is carried on the resilient arms 38 that extend from a Belleville spring 40. This spring has pertaining thereto the weights 42 which will move outwardly at a predetermined motor speed causing the Belleville spring to snap and to move the contact arm 34 to separate the contact elements 30 and 32 thereby to cut the starting windings out of circuit. Similarly, when the motor slows down, the resilience of the Belleville spring causes it to snap inwardly again to cause the contact elements to engage.

The inside of the motor housing is ventilated by means of ports 44 and 46 through which air is circulated by a fan 48 mounted on the shaft 50 of the rotor.

The shaft 50 extends through a seal 52 mounted in the upper side of lower member 24 and then extends through a sleeve bearing 54 mounted in member 24. A thrust washer 56 is preferably provided at the upper end of bearing 54 to support the weight of the rotating portion of the electric motor.

Beneath sleeve bearing 54, shaft 50 is provided with a groove 56 that receives a snap ring 58 which holds the shaft and bearing in assembled relation.

Beneath the snap ring, shaft 50 has a gear or pinion portion 60 formed thereon and beneath this gear or pinion portion 60 there is mounted ball bearing 62 retained on the end of the shaft by snap ring 64. The outer race of ball bearing 62 is received in a bore in the lower wall of a housing 66. Within the bore is a snap ring 68 which the outer race of bearing 62 abuts and a closure member 70 is mounted on the lower end of housing 66 and has an axial flange that abuts the bottom of the outer race of the antifriction bearing. Cap 70 is attached to the housing by screws 72 and there may be one or more dowel elements 74 connecting the cap to the housing and providing means for transmitting rotative effort therebetween.

The reason for transmitting rotative effort between the housing and cap is that the cap forms a part of a bayonet type connection, the other part of which is embodied in the tool structure 76 which may be a brush, or scrubbing tool, or work tool of a nature that is required to rotate.

The housing 66 is a generally cup-shaped member with a cap portion 78 at the upper end attached to the housing as by screws 80 and which may also be doweled to the housing if so desired. The cap portion and the housing are utilized as a carrier for planetary gearing which takes the form of the larger gears 81 that mesh with the gear or pinion portion 60 of shaft 50 and which larger gears are connected by keys 82 by the hubs of smaller gears 84. These smaller gears mesh with a gear ring 86 that is fixed to the lower member 24 of the electric motor housing by cap screws 88. The gear ring 86 may also be doweled or keyed to the dependent hub part 90 of the cover member 24 on which the gear ring is mounted.

The planetary gears described above are rotatably carried on the support shafts 92 that extend between the cap or cover member 78 and the housing 66. It will be evident that rotation of shaft 50 will cause rotation of the compound planet gears 80, 84 which will then roll about gear ring 86 and carry with them housing 66 and lower cap 70 which will cause rotation of the tool 76 attached thereto.

Since the housing and its top cap or cover member 78 rotate, there is provided between the cover plate and the hub 90 of member 24, a bearing such as the sleeve bearing 94. The sleeve bearing is located within an upstanding central hub part of member 78 and surrounding this upstanding hub part is an oil seal 96 carried on the underside of the lower member 24 of the electric motor housing.

A plugged opening 98 in the wall of housing 66 permits this member to be filled with oil up to a desired level and this will provide lubrication for lower bearing 62 and for the gears of the planetary gear system and their supporting shafts and will likewise provide lubrication for sleeve bearing 94 as well as for sleeve bearing 54 to which the oil has access via a passage means 100 provided in bearing 54 and along the inside of gear ring 86 at one side.

The compound planetary gears are supported against axial movement on their supporting shafts by the thrust bearings, or thrust washers 102 so that the entire unit will run quietly and efficiently.

The described motor arrangement is particularly well adapted for mounting on the frame 104 of a floor scrubber, or a like machine, as by availing of the bolts 106, but it will be understood also that the motor has utility in other circumstances, particularly, in any circumstances in which an extremely compact motor construction is desired especially one desiring a speed reducing system at the output end of the motor.

The motor construction described is particularly advantageous where the motor is operating vertically and introduces problems in connection with proper lubrication with the upper most bearing, but it will be evident that the motor could also be operated in any other position including a horizontal position. By grouping the supporting bearings for the motor rotor at one end of the shaft, there is provided an arrangement whereby a single oil reservoir will adequately lubricate all of the bearings.

Still further, by leaving the bearing off at one end of the rotor shaft, any switching arrangement, such as is required by a split phase motor in which the starting winding is cut out at operating speed, is exposed for easy servicing and the switch can be serviced, or replaced, or adjusted without in any way interfering with the other parts of the motor or driving arrangement.

While the advantages of the present invention become particularly apparent in connection with a motor construction involving a starting switch, it will be evident that the principles of the present invention could be practiced in connection with motors that did not require a starting switch, for example, polyphase motors, direct current motors, and repulsion induction motors. With repulsion motors and direct current motors, a rotor is employed with a commutator and there are brushes provided which ride in the commutator.

With the arrangement of the present invention, the unjournaled end of the rotor, or armature shaft, could be the commutator end and the brush ring would then be mounted inside the dust cover 20 for easy accessibility to replace the brushes, or otherwise service the commutator, or brushes, or brush ring, and the same advantages would obtain, as mentioned before, that this could be done without interfering with any other part of the motor, or drive arrangement.

Figure 4:
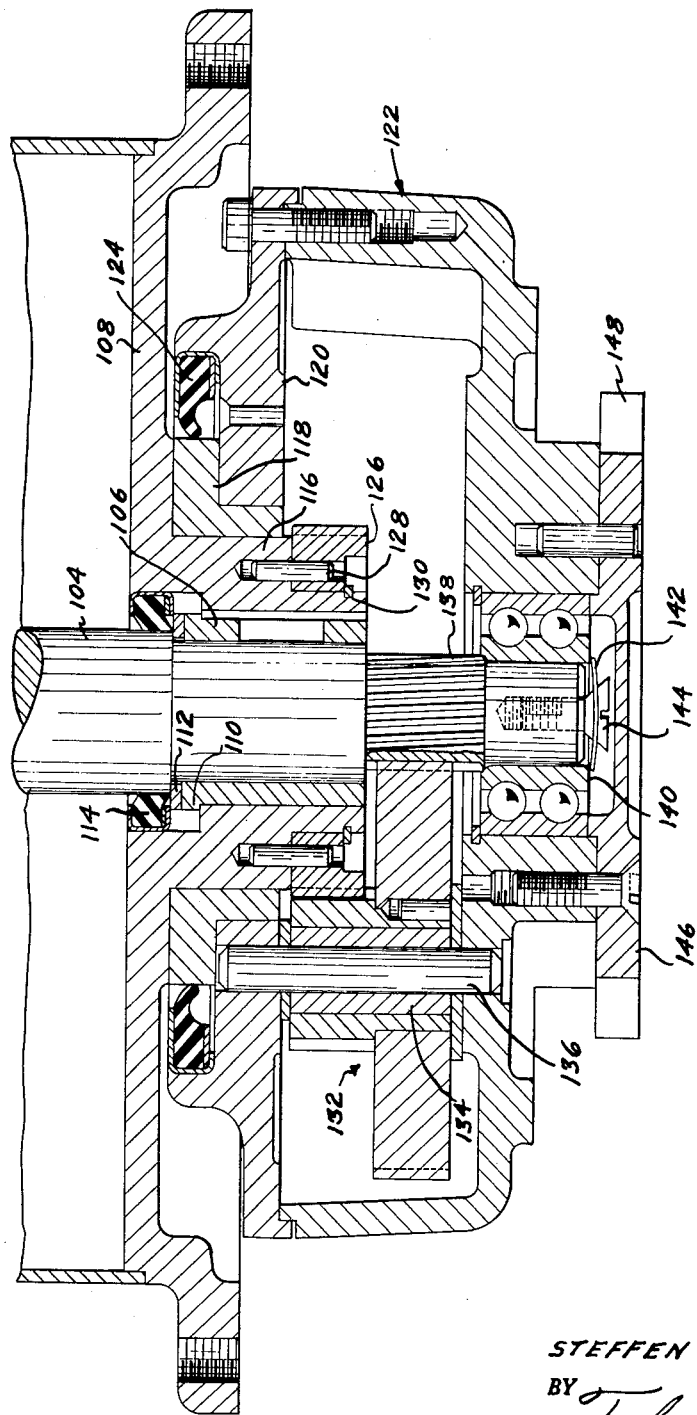
FIGURE 4 is a view showing a modified arrangement for the rotary housing containing the speed reducing mechanism.

The arrangement illustrated in FIGURE 4 is a modification in which the motor shaft 104 is supported in sleeve bearing 106 in the lower wall 108 of the motor housing. This sleeve bearing is shouldered at its upper end as at 110 and between the sleeve bearing and the shaft at the upper end of the sleeve bearing is thrust washer 112 which the shoulder on the shaft engages. A fluid seal 114 is mounted in end member 108 and sealingly engages the shaft.

The hub 116 of end member 108 of the motor case supports a large sleeve bearing element 118 which is L-shaped in configuration and which rotatably receives the top cover 120 of gear housing 122. The horizontally extending flange portion of bearing 108 engages fluid seal 124 carried by top plate 120 of housing 122. Bearing arrangement 118 is so constructed that it provides radial support for the housing and also resists end thrusts thereon to which the housing would be subjected when the motor was used, for example, on a floor scrubber, or waxer, or the like.

Hub 116 receives the stationary sun gear 126 which is doweled to the hub by pins 128 and held thereon by snap ring 130.

The compound pinion means 132 are mounted on bushing means 134 that receive the shafts or pins 136 carried by housing 122.

At the lower end of shaft 104, below sun gear portion 138 thereof, is the single or double row antifriction bearings means 140 retained in position on the shaft by the heavy spring washer 142 that is fixed to the shaft by screw 144.

As with the previous modification, the housing has attached to the lower part thereof plate 146 that holds the outer race of the antifriction bearing in the housing and which has elements 148 by means of which a tool can be supported on the housing.

In operation, the modification of FIGURE 4 is the same as the modification previously described.

It is to be understood that the sleeve bearings shown could be replaced by antifriction bearings, such as ball bearings; and vice versa so that the present invention is not intended to be limited to the particular bearing arrangement illustrated in the drawings.

It will be understood that this invention is susceptible to modification in order to adapt it to different usages and conditions; and, accordingly, it is desired to comprehend such modifications within this invention as may fall within the scope of the appended claims.

What is claimed is:

1. In combination; an electric motor having a casing with an end wall, a motor shaft extending through said end wall and journaled therein, a first gear on the shaft outside the casing and adjacent said end wall, a second gear different in size from said first gear and concentric with the shaft and fixed to said end wall, a rotatable housing journaled on said end wall enclosing said gears, compound planet gear means in the housing meshing with said first and second gears so the housing is driven in rotation when said shaft rotates, and a bearing in the housing receiving the end of said shaft.

2. In combination; an electric motor having a casing, an end wall on the casing, a motor shaft extending through the end wall and journaled therein, said end wall having a hub portion projecting outwardly from the casing in which the bearing for said shaft is mounted, a first gear carried by said shaft adjacent said end wall and outside the casing, a second gear different in size from said first gear and concentric with said first gear fixed to said hub, a housing journaled on said end wall so as to be rotatable on the axis of said shaft and enclosing said gears, and compound planet gear means rotatably mounted in said housing and meshing with said first and second gears so that rotation of said gears will drive said housing in rotation, said housing comprising means for supporting a tool to be driven thereby.

3. In combination; an electric motor having a casing, an end wall on the casing at one end, a central hub on the outside of the end wall, a motor shaft extending through said end wall, a bearing in said hub rotatably supporting said shaft, a first gear on the shaft adjacent the hub outside said casing, a second gear different in size from said first gear and fixed to said hub and concentric with said first gear, a rotatable housing, a bearing on the outside of said hub supporting said housing, said housing enclosing said gears, compound planet gear means rotatably mounted in said housing and meshing with first and second gears for driving the housing in rotation when the motor shaft turns, and an antifriction bearing mounted on the end of the shaft on the opposite side of said first gear from said hub and said bearing also being supported in said housing.

4. In combination; an electric motor having a casing, an end wall on the casing at one end, a central hub on the outside of the end wall, a motor shaft extending through said end wall, a bearing in said hub rotatably supporting said shaft, a first gear on the shaft adjacent the hub outside said casing, a second gear different in size from said first gear and fixed to said hub and concentric with said first gear, a rotatable housing, a bearing on the outside of said hub supporting said housing, said housing enclosing said gears, compound planet gear means rotatably mounted in said housing and meshing with first and second gears for driving the housing in rotation when the motor shaft turns, and an antifriction bearing mounted on the end of the shaft on the opposite side of said first gear from said hub and said bearing also being supported in said housing, said antifriction bearing having an inner race fixed to the shaft against axial movement thereon and having an outer race fixed in the housing thereby to support the housing against axial movement relative to the shaft.

5. In combination; an electric motor having a casing, an end wall at one end of said casing, a hub on the end wall projecting away from the casing, a motor shaft extending through the end wall, a sleeve bearing in said hub rotatably supporting said shaft, means on the shaft engaging opposite ends of said sleeve bearing to prevent axial movement of the shaft in the sleeve bearing, a first gear on the shaft adjacent said hub, a second gear of a size different from that of the first gear fixed to the hub, compound planet pinion means meshing with said gears, a housing enclosing said hub and said gears, a bearing on the hub journaling the housing thereon, shaft means in the housing rotatably supporting said compound planet pinion means therein, an antifriction bearing between the housing and the end of said shaft having one race fixed to the shaft and another race fixed to the housing, a rotary seal between the housing and said end wall, and said housing being enclosed and adapted for receiving a quantity of lubricant for lubricating said bearings and gears.

6. In combination; an electric motor having a casing, an end wall at one end of said casing, a hub on the end wall projecting away from the casing, a motor shaft extending through the end wall, a sleeve bearing in said hub rotatably supporting said shaft, means on the shaft engaging opposite ends of said sleeve bearing to prevent axial movement of the shaft in the sleeve bearing, a first gear on the shaft adjacent said hub, a second gear of a size different from that of the first gear fixed to the hub, compound planet pinion means meshing with said gears, a housing enclosing said hub and said gears, a bearing on the hub journaling the housing thereon, shaft means in the housing rotatably supporting said compound planet pinion means therein, an antifriction bearing between the housing and the end of said shaft having one race fixed to the shaft and another race fixed to the housing, a rotary seal between the housing and said end wall, and said housing being enclosed and adapted for receiving a quantity of lubricant for lubricating said bearings and gears, there being a rotary fluid seal in said end wall surrounding said shaft.

7. In combination; an electric motor having a stator and a rotor and a shaft connected to the rotor, a motor casing supporting the stator and having an end wall at one end, a hub on the outer face of said end wall, said shaft extending through said hub, a sleeve bearing in said hub supporting the shaft therein, a shoulder on the shaft adjacent the end of said sleeve bearing that is toward the inside of said end wall, a thrust washer surrounding the shaft between said shoulder and said sleeve bearing, a fluid seal carried by said end wall on the inside sealingly engaging said shaft, a snap ring on the shaft at the end of said sleeve bearing opposite the thrust washer, a first gear formed on said shaft adjacent said hub, said hub being formed with a shoulder, a second gear mounted on the shoulder of said hub and fixed to the end wall, a housing, a bearing on the outside of said hub rotatably supporting said housing on the hub, a fluid seal carried by the outside of said end wall sealingly engaging said housing, shaft means in said housing parallel with said motor shaft, compound planet gear means rotatably mounted on said shaft means and meshing with said first and second gears, an antifriction bearing between said housing and the end of said shaft comprising an inner race fixed to said shaft and an outer race fixed to said housing, and said housing being adapted for receiving a supply of lubricant for said bearings and gears.

8. In combination; an electric motor having a stator and a rotor and a shaft connected to the rotor, a motor casing supporting the stator and having an end wall at one end, a hub on the outer face of said end wall, said shaft extending through said hub, a sleeve bearing in said hub supporting the shaft therein, a shoulder on the shaft adjacent the end of said sleeve bearing that is toward the inside of said end wall, a thrust washer surrounding the shaft between said shoulder and said sleeve bearing, a fluid seal carried by said end wall on the inside sealingly engaging said shaft, a snap ring on the shaft at the end of said sleeve bearing opposite the thrust washer, a first gear formed on said shaft adjacent said hub, said hub being formed with a shoulder, a second gear mounted on the shoulder of said hub and fixed to the end wall, a housing, a bearing on the outside of said hub rotatably supporting said housing on the hub, a fluid seal carried by the outside of said end wall sealingly engaging said housing, shaft means in said housing parallel with said motor shaft, compound planet gear means rotatably mounted on said shaft means and meshing with said first and second gears, an antifriction bearing between said housing and the end of said shaft comprising an inner race fixed to said shaft and an outer race fixed to said housing, and said housing being adapted for receiving a supply of lubricant for said bearings and gears, said housing being adapted for receiving and supporting a tool or the like to be driven by the housing when the latter rotates.

9. In combination; an electric motor having a stator and a rotor and a shaft connected to the rotor, a motor casing supporting the stator and having an end wall at one end, a hub on the outer face of said end wall, said shaft extending through said hub, a first bearing in said hub supporting the shaft therein, a shoulder on the shaft adjacent the end of said first bearing that is toward the inside of said end wall, a thrust washer surrounding the shaft between said shoulder and said first bearing, a fluid seal carried by said end wall on the inside sealingly engaging said shaft, a snap ring on the shaft at the end of said first bearing opposite the thrust washer, a first gear formed on said shaft adjacent said hub, said hub being formed with a shoulder, a second gear mounted on the shoulder of said hub and fixed to the end wall, a housing, a bearing on the outside of said hub rotatably supporting said housing on the hub, a fluid seal carried by the outside of said end wall sealingly engaging said housing, shaft means in said housing parallel with said motor shaft, compound planet gear means rotatably mounted on said shaft means and meshing with said first and second gears, an antifriction bearing between said housing and the end of said shaft comprising an inner race fixed to said shaft and an outer race fixed to said housing, and said housing being adapted for receiving a supply of lubricant for said bearings and gears and there being passage means for lubricant leading through said hub to said sleeve bearing.

10. In combination: an electric motor having a stator and a rotor and a shaft connected to the rotor, a motor casing supporting the stator and having an end wall at one end, a hub on the outer face of said end wall, said shaft extending through said hub, a first bearing in said hub supporting the shaft therein, a shoulder on the shaft adjacent the end of said first bearing that is toward the inside of said end wall, a thrust washer surrounding the shaft between said shoulder and said first bearing, a fluid seal carried by said end wall on the inside sealingly engaging said shaft, a snap ring on the shaft at the end of said first bearing opposite the thrust washer, a first gear formed on said shaft adjacent said hub, said hub being formed with a shoulder, a second gear mounted on the shoulder of said hub and fixed to the end wall, a housing, a bearing on the outside of said hub rotatably supporting said housing on the hub, a fluid seal carried by the outside of said end wall sealingly engaging said housing, shaft means in said housing parallel with said motor shaft, compound planet gear means rotatably mounted on said shaft means and meshing with said first and second gears, an antifriction bearing between said housing and the end of said shaft comprising an inner race fixed to said shaft and an outer race fixed to said housing, and said housing being adapted for receiving a supply of lubricant for said bearings and gears, said casing at the end opposite said end wall being provided with a dust cover.

11. In combination: an electric motor having a stator and a rotor and a shaft connected to the rotor, a motor casing supporting the stator and having an end wall at one end, a hub on the outer face of said end wall, said shaft extending through said hub, a first bearing in said hub supporting the shaft therein, a shoulder on the shaft adjacent the end of said first bearing that is toward the in- side of said end wall, a thrust washer surrounding the shaft between said shoulder and said first bearing, a fluid seal carried by said end wall on the inside sealingly engaging said shaft, a snap ring on the shaft at the end of said first bearing opposite the thrust washer, a first gear formed on said shaft adjacent said hub, said hub being formed with a shoulder, a second gear mounted on the shoulder of said hub and fixed to the end wall, a housing, a bearing on the outside of said hub rotatably supporting said housing on the hub, a fluid seal carried by the outside of said end wall sealingly engaging said housing, shaft means in said housing parallel with said motor shaft, compound planet gear means rotatably mounted on said shaft means and meshing with said first and second gears, an antifriction bearing between said housing and the end of said shaft comprising an inner race fixed to said shaft and an outer race fixed to said housing, and said housing being adapted for receiving a supply of lubricant for said bearings and gears, said casing at the end opposite said end wall being provided with a dust cover, said dust cover being adapted for supporting switch means for controlling the motor and which switch means is fully accessible upon removal of the dust cover from the casing.

12. In combination: an electric motor having a casing, an end wall at one end of said casing, a hub on the end wall projecting away from the casing, a motor shaft extending through the end wall, a bearing in said hub rotatably supporting said shaft, a first gear on the shaft adjacent said hub, a second gear of a size different from that of the first gear fixed to the hub, compound planet pinion means meshing with said gears, a housing enclosing said hub and said gears, a bearing on the hub journaling the housing thereon, shaft means in the housing rotatably supporting said compound planet pinion means therein, an antifriction bearing between the housing and the end of said shaft having one race fixed to the shaft and another race fixed to the housing, a rotary seal between the housing and said end wall, and said housing being enclosed and adapted for receiving a quantity of lubricant for lubricating said bearings and gears, said bearing on the hub journaling the housing being a sleeve bearing L-shaped in cross section having an axial portion supporting the housing radially and having a lateral portion disposed between the housing and the said end wall of the casing for sustaining radial thrusts on said housing.

13. In combination; an electric motor having a casing, an end wall at one end of said casing, a hub on the end wall projecting away from the casing, a motor shaft extending through the end wall, a bearing in said hub rotatably supporting said shaft, a first gear on the shaft adjacent said hub, a second gear of a size different from that of the first gear fixed to the hub, compound planet pinion means meshing with said gears, a housing enclosing said hub and said gears, a bearing on the hub journaling the housing thereon, shaft means in the housing rotatably supporting said compound planet pinion means therein, an antifriction bearing between the housing and the end of said shaft having one race fixed to the shaft and another race fixed to the housing, a rotary seal between the housing and said end wall, and said housing being enclosed and adapted for receiving a quantity of lubricant for lubricating said bearings and gears, said bearing on the hub journaling the housing being a sleeve bearing L-shaped in cross section having an axial portion supporting the housing radially and having a lateral portion disposed between the housing and the said end wall of the casing for sustaining radial thrusts on said housing, and said rotary seal between the housing and said end wall comprising a rotary seal carried by the housing and engaging the periphery of the said lateral portion of the bearing between the housing and said end wall of the casing.

14. In combination; an electric motor having a casing, an end wall at one end of said casing, a hub on the end wall projecting away from the casing, a motor shaft extending through the end wall, a bearing in said hub rotatably supporting said shaft, a first gear on the shaft adjacent said hub, a second gear of a size different from that of the first gear fixed to the hub, compound planet pinion means meshing with said gears, a housing enclosing said hub and said gears, a bearing on the hub journaling the housing thereon, shaft means in the housing rotatably supporting said compound planet pinion means therein, an antifriction bearing between the housing and the end of the shaft, said antifriction bearing having its outer race fixed to said housing and having an inner race engaging a shoulder on said shaft, a resilient element fixed to the shaft and engaging the end of said inner race opposite the shoulder on the shaft, said bearing on the hub comprising an axial portion journaling the housing against radial thrusts and a lateral portion extending outwardly from said axial portion and disposed between the housing and the end wall to support the housing against axial thrusts thereon, and seal means carried by the housing and engaging the periphery of said lateral portion of said bearing on the hub.

15. In combination; an electric motor having a stator and a rotor and a shaft connected to the rotor, a motor casing supporting the stator having an end wall at one end, a hub projecting outwardly from the outer face of said end wall, said shaft extending through said hub, a first bearing in said hub supporting said shaft therein, said bearing being shouldered on the end toward the rotor and engaging a shoulder in said end wall, a shoulder on the shaft adjacent the rotor end of said first bearing, a thrust washer between the shoulder on the shaft and the end of the first bearing, a first gear on said shaft adjacent the hub on the opposite side thereof from the rotor, a second gear fixedly mounted on said hub, a housing, a sleeve bearing on the outside of said hub having an axial portion supporting said housing radially and having a lateral portion disposed between the housing and the end wall supporting the housing against axial thrusts, a fluid seal on the housing engaging the periphery of the lateral portion of said bearing on the hub, shaft means in said housing parallel with said motor shaft, compound planet gear means rotatably mounted on said shaft means and meshing with said first and second gears, an antifriction bearing between said housing and the end of the shaft and comprising an outer race fixed to said housing and an inner race on the end of the shaft, a shoulder on the shaft abutting one side of said race, and a resilient washer shutting the other end of said race and attached to the end of said shaft thereby providing for a degree of relative expansion axially of said shaft and housing.

No references cited.